METHOD OF PRODUCING PHOTOSENSITIVE LAYERS OF LEAD SELENIDE

Filed Aug. 3, 1961

INVENTOR.

BY HEINRICH GOBRECHT

ATTORNEY

United States Patent Office 3,226,253
Patented Dec. 28, 1965

3,226,253

METHOD OF PRODUCING PHOTOSENSITIVE LAYERS OF LEAD SELENIDE

Heinrich Gobrecht, Berlin-Schlachtensee, Germany, assignor to International Standard Electric Corporation, New York, N.Y., a corporation of Delaware Filed Aug. 3, 1961, Ser. No. 129,133
Claims priority, application Germany, Aug. 23, 1960, St 16,834
7 Claims. (Cl. 117—201)

Figure 2:
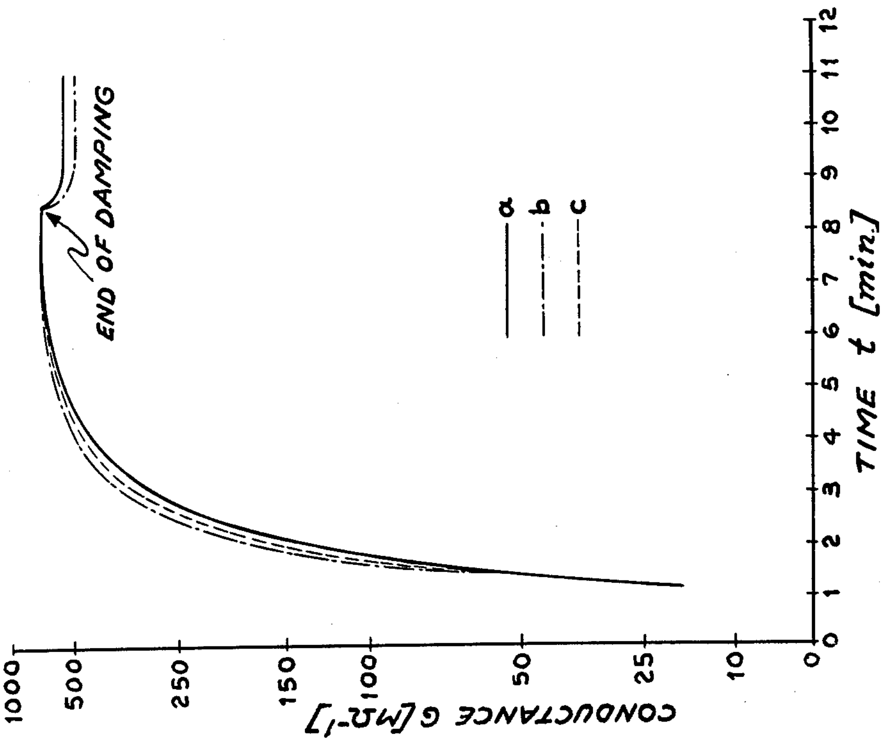

This invention relates to a method of producing photosensitive layers, especially layers of lead selenide which, as is well-known, are particularly suitable as radiation receivers in the ultrared spectral region, because they change their resistance when being exposed.

Photosensitive layers of lead selenide are known as such. They are produced, for example, by evaporating this compound in vacuo on to a suitable base.

In connection with the manufacture of other types of photosensitive layers, however, it is also known to perform the evaporation on to hot base plates. For the evaporation itself, in accordance with the state of prior art, there are various possibilities. Thus, for example, it is known to produce extremely thin layers of selenium compounds, such as cadmium selenide, by a simultaneous evaporation of the components. It is assumed that during this process the chemical compound is produced in the vapour or steam stage, and is then deposited on the base provided for the participation.

Finally, it is known to sensibilize lead selenide layers in air under increased temperatures.

Although the aforementioned measures were known partly in a direct connection with the production of lead selenide layers, and partly in another connection, it is true that it was impossible up to now to obtain photosensitive layers of lead selenide with a good sensitivity and, at the same time, with reliable reproducibility.

This state of prior art is completed by the invention in solving the problem of manufacturing photosensitive layers of lead selenide of high sensitivity. According to the invention this problem is solved in that lead selenide and selenium are evaporated in vacuo on to a base heated to such a temperature that on this base there is formed a layer of pure lead selenide, whereas the excess selenium is evaporated away.

As a starting substance, according to the invention, there is used pure lead selenide or, in particular, monocrystals of lead selenide and pure selenium. The evaporation of the components can be effected simultaneously or alternately. In the case of an alternate evaporation care has to be taken that the alternation is carried out at very short time intervals, inorder to obtain uniform layers of lead selenide. In addition thereto, in this particular case, the process has to be started with the evaporation of the lead selenide, because it has been proved that Pb (lead) particles preferably precipitate on heated bases, where they form crystal germs.

As a base for the layers to be manufactured there can be used glass, quartz, or other insulating materials, and also such ones permitting the passage of ultrared light, which are appropriately provided with the electrodes for the radiation receiver, e.g. with evaporated layers of gold, prior to the evaporation of the layer of lead selenide.

According to the invention the temperature of the base, during the evaporation process, shall amount preferably to more than 200° C. and less than 320° C. since experiments have proved that in this temperature interval there is ensured the formation of pure, very well adhering, reflecting layers of lead selenide that are reproducible with respect to their properties.

Upon termination of the evaporation process the sensibilization of the layer of lead selenide is carried out in accordance with the invention in the following way; First of all the evaporated layer of lead selenide is exposed for a period of about 2 hours in air to a constant temperature ranging between 165° and 170° C. Thereafter the layer is tempered or annealed in vacuo for a period of about 1 hour at a constant temperature ranging between 250° and 260° C.

The sensibilization of layers other than of lead selenide is carried out in an analogous manner at suitable temperatures.

The sensitivity of the layers produced and sensibilized in accordance with the invention, according to the presently existing results of investigations, is at about two powers of ten higher than the photosensitivity of the layers produced in accordance with the prior art. In particular these most sensitive layers are no longer obtained at random, but with a high reliability.

Figure 1:
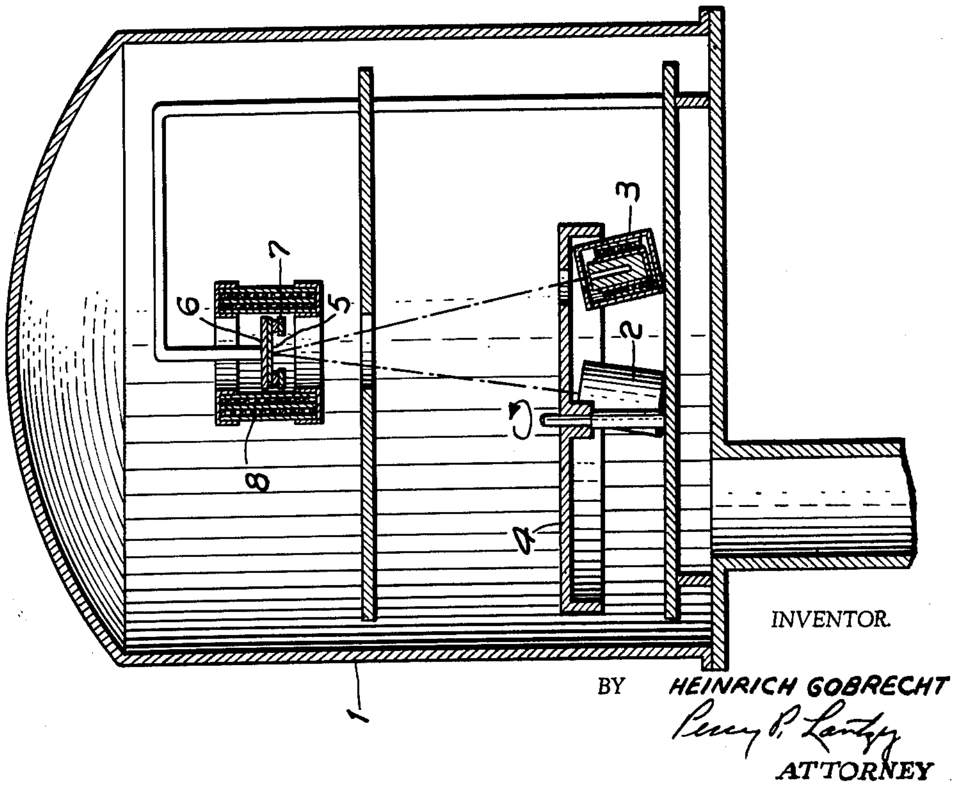

In practice, the invention can be carried out, for example, with an apparatus shown in FIG. 1. The vacuum container 1 consists of a steel receiver of suitable size and may be evacuated e.g. by means of an oil-difussion pump provided with a water-cooled oil collector. In the vacuum container there is provided one evaporation oven (2, 3) each for lead selenide and selenium, and over them there is arranged a rotatable shield 4 which at random permits the release of the vapor rays from the source of evaporation either alternately individually or else in common.

The base 5 which is already provided with the evaporated gold electrodes, is mounted to a base plate of copper 6, and may be provided with a shield of mica 7, in order to enable conductivity measurements during the evaporation process.

Over the entire layer-holding arrangement there is slipped a heating device 8 which may consist e.g. of a box-shaped frame of nickel sheet, in the three vertical walls of which there is inserted each time three small mica plates, of which the middle one carries the heater winding. The layer temperature which is adjusted with the aid of this heating device, and which can be kept constant with the aid of conventional means, is measured within the mica diaphragm with the aid of the thermoelement.

Appropriately prior to the actual beginning of the evaporation process, the system is heated in vacuo to a temperature of about 300° C., in order to obtain good vacuum conditions for the process itself. During the heating process the walls of the evaporation container are kept at room temperature preferably with the aid of a strong ventilator.

In order to obtain an optimum reproducibility of the evaporation process the following conditions are to be given preference:

(a) The amount of selenium impinging upon the base must be so large that the layer can grow with the maximum possible excess selenium. The rate of impingement of the selenium, with respect to the order of magnitude, is about four to five times greater than that of the equivalent amount of lead of the evaporated lead selenide.

(b) The temperature of the layer base must be so high that the selenium particles which cannot be incorporated into the layer, can be evaporated away within a period of time which is small with respect to the entire evaporaration time. Preferred temperature interval: 200° to 320° C.

Under these conditions it is possible to obtain an almost identical course of the conductance G with respect to layers produced independently of one another. This is shown in FIG. 2 with respect to three different layers *a*, *b*, *c* which are evaporated on a base with a temperature of 300° C., at a temperature of the selenium oven of 220° C., and at a temperature of the lead selenide crystal of 900° C.

These layers also maintained their substantial properties in the course of further measurements.

It is still to be noted that the obtained layers are strongly p-conducting. Experiments have shown, however, that by heating in a vacuum container without a noticeable selenium partial pressure, the layers can be changed to the n-conducting state. The invention also covers this process.

I claim:

1. The method of producing photosensitive layers of lead selenide comprising the steps of disposing a base within a vacuum chamber, evaporating lead selenide and pure selenium within said chamber, said lead selenide being evaporated at a higher temperature than said selenium, and heating the base to such a temperature that pure lead selenide is formed in a layer on said base and the excess of said selenium is evaporated away.

2. The method of producing photosensitive layers of lead selenide comprising the steps of disposing a base of light transparent insulating material provided with a metallic electrode layer within a vacuum chamber, evaporating within said chamber onto said base lead selenide and pure selenium, said lead selenide being evaporated at a higher temperature than said selenium, and heating said base to a temperature within a range of 200° C. and 320° C. such that a layer of pure lead selenide is formed thereon and the excess selenium is evaporated away.

3. The method of producing photosensitive layers of lead selenide according to claim 1 wherein said base is maintained at a temperature within the range of 200° C. and 320° C.

4. The method of producing photosensitive layers of lead selenide according to claim 2 comprising the further steps of sensibilizing the produced layers of said lead selenide for a period of approximately two hours in air at a temperature between 165° C. and 175° C. and tempering said layers for approximately one hour in a vacuum at a temperature between 250° C. and 260° C.

5. The method of producing photosensitive layers of lead selenide on a base comprising the steps of disposing a base of light transparent insulating material provided with a metallic electrode layer within a vacuum chamber, heating said chamber, evaporating in said chamber monocrystals of lead selenide and pure selenium, said lead selenide being evaporated at a higher temperature than said selenium, heating said base to a temperature ranging between 200° C. and 320° C. so that pure lead selenide is formed on said base by evaporating away the excess selenium, sensibilizing the produced layers of lead selenide for a period of approximately two hours in air at a constant temperature ranging between 165° C. and 170° C. and tempering said produced layers of lead selenide in a vacuum at a temperature ranging between 250° C. and 260° C.

6. The method according to claim 5 wherein the evaporation of said lead selenide and said pure selenium is produced simultaneously.

7. The method according to claim 5 wherein the evaporation of said lead selenide and said pure selenium is produced alternately, with the lead selenide being evaporated first.

References Cited by the Examiner

UNITED STATES PATENTS

| | | | |
|---|---|---|---|
| 2,898,240 | 8/1959 | Owen | 117—200 |
| 2,921,905 | 1/1960 | Hung-Chi Chang | 252—62.3 |
| 2,928,761 | 3/1960 | Gremmelingier et al. | 148—1.5 |

FOREIGN PATENTS

| | | |
|---|---|---|
| 1,041,582 | 10/1958 | Germany. |

RICHARD D. NEVIUS, *Primary Examiner.*